United States Patent
Lengyel et al.

(10) Patent No.: US 11,757,853 B2
(45) Date of Patent: Sep. 12, 2023

(54) METHOD FOR RESTRICTING ACCESS TO A MANAGEMENT INTERFACE USING STANDARD MANAGEMENT PROTOCOLS AND SOFTWARE

(71) Applicant: Telefonaktiebolaget LM Ericsson (publ), Stockholm (SE)

(72) Inventors: Balázs Lengyel, Budapest (HU); Joel Halpern, Leesburg, VA (US); Ignacio Más Ivars, Tullinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 263 days.

(21) Appl. No.: 17/269,429

(22) PCT Filed: Aug. 30, 2018

(86) PCT No.: PCT/IB2018/056644
§ 371 (c)(1),
(2) Date: Feb. 18, 2021

(87) PCT Pub. No.: WO2020/044082
PCT Pub. Date: Mar. 5, 2020

(65) Prior Publication Data
US 2021/0203646 A1     Jul. 1, 2021

(51) Int. Cl.
*H04L 29/00* (2006.01)
*H04L 9/40* (2022.01)
*H04L 41/28* (2022.01)

(52) U.S. Cl.
CPC .......... *H04L 63/0435* (2013.01); *H04L 41/28* (2013.01); *H04L 63/083* (2013.01); *H04L 63/101* (2013.01)

(58) Field of Classification Search
CPC ... H04L 63/0435; H04L 41/28; H04L 63/083; H04L 63/101; H04L 63/10; H04L 41/0213; H04L 63/08
See application file for complete search history.

(56) References Cited

U.S. PATENT DOCUMENTS

| | | | |
|---|---|---|---|
| 7,735,140 B2 * | 6/2010 | Datla | H04L 63/1425 726/25 |
| 7,810,138 B2 * | 10/2010 | Vank | H04L 63/162 713/153 |

(Continued)

FOREIGN PATENT DOCUMENTS

| | | | | |
|---|---|---|---|---|
| CN | 101719259 A | * | 6/2010 | |
| WO | WO-2016024220 A1 | * | 2/2016 | ......... H04L 63/0838 |

OTHER PUBLICATIONS

"YANG Boot Camp" presented at IETF 71, Mar. 9-14, 2008, Philadelphia, PA, 28 pages, downloaded from http://www.yang-central.org/twiki/bin/view/Main/YangTutorials on Feb. 12, 2021.

(Continued)

*Primary Examiner* — Don G Zhao
(74) *Attorney, Agent, or Firm* — Christopher & Weisberg, P.A.

(57) ABSTRACT

A method by a network device to restrict access to a management interface, where the management interface is defined by a data model, and where the network device is provided by an equipment provider to an equipment operator for use by the equipment operator. The method includes receiving a first request from a management system to perform a first management operation that involves accessing a module of the data model, where the first request specifies a security credential as a key for a security wrapper defined by the module, and where the security credential is supplied to the management system by the equipment provider and is inaccessible to the equipment operator, verify- (Continued)

ing whether the security credential specified by the first request is valid, and performing the first management operation in response to verifying that the security credential specified by the first request is valid.

17 Claims, 9 Drawing Sheets

(56) References Cited

U.S. PATENT DOCUMENTS

| | | | | |
|---|---|---|---|---|
| 8,239,923 | B2* | 8/2012 | Kirshnan | H04L 63/12 |
| | | | | 709/224 |
| 9,104,836 | B2* | 8/2015 | Burstein | H04L 63/08 |
| 9,210,167 | B1* | 12/2015 | Lafuente | H04L 63/0838 |
| 9,253,639 | B1* | 2/2016 | Lafuente | H04W 12/06 |
| 9,436,820 | B1* | 9/2016 | Gleichauf | H04L 63/02 |
| 9,723,003 | B1* | 8/2017 | McClintock | H04L 63/10 |
| 10,225,096 | B2* | 3/2019 | Ansari | H04L 12/2818 |
| 10,454,887 | B2* | 10/2019 | Weis | H04L 63/123 |
| 11,134,056 | B2* | 9/2021 | Shaw | H04L 63/101 |
| 11,363,318 | B2* | 6/2022 | Ansari | B05D 3/002 |
| 2001/0027484 | A1* | 10/2001 | Nishi | H04L 12/46 |
| | | | | 709/223 |
| 2003/0233583 | A1* | 12/2003 | Carley | H04M 3/2263 |
| | | | | 726/3 |
| 2005/0165834 | A1* | 7/2005 | Nadeau | H04L 63/102 |
| 2005/0182973 | A1* | 8/2005 | Funahashi | H04L 63/083 |
| | | | | 726/19 |
| 2006/0112418 | A1* | 5/2006 | Bantz | G06F 21/88 |
| | | | | 726/4 |
| 2007/0039039 | A1* | 2/2007 | Gilbert | H04L 63/0853 |
| | | | | 726/4 |
| 2007/0147619 | A1* | 6/2007 | Bellows | H04W 12/041 |
| | | | | 380/277 |
| 2010/0192212 | A1* | 7/2010 | Raleigh | H04W 12/08 |
| | | | | 726/7 |
| 2012/0167185 | A1* | 6/2012 | Menezes | H04L 67/563 |
| | | | | 726/5 |
| 2013/0254519 | A1* | 9/2013 | Benoit | H04W 12/04 |
| | | | | 713/1 |
| 2015/0049631 | A1* | 2/2015 | Heron | H04L 41/122 |
| | | | | 370/254 |
| 2017/0006034 | A1* | 1/2017 | Link, II | H04L 63/08 |
| 2017/0188224 | A1* | 6/2017 | Weniger | H04W 8/065 |
| 2017/0339144 | A1* | 11/2017 | Han | H04L 9/3268 |
| 2017/0353496 | A1* | 12/2017 | Pai | H04L 63/1433 |
| 2018/0176077 | A1* | 6/2018 | Kanakarajan | H04L 9/3247 |
| 2018/0248744 | A1* | 8/2018 | Danisik | H04L 67/1031 |
| 2018/0309642 | A1* | 10/2018 | Rutten | G06F 40/143 |
| 2018/0324159 | A1* | 11/2018 | Koya | H04L 63/10 |
| 2019/0238506 | A1* | 8/2019 | Shaw | H04L 63/102 |
| 2019/0238591 | A1* | 8/2019 | Shaw | H04L 63/0281 |
| 2019/0268219 | A1* | 8/2019 | Haapanen | H04L 41/0803 |
| 2019/0268229 | A1* | 8/2019 | Haapanen | H04L 41/0803 |
| 2020/0195640 | A1* | 6/2020 | Kurahashi | G06F 21/45 |
| 2021/0105178 | A1* | 4/2021 | K | H04L 45/64 |

OTHER PUBLICATIONS

RFC 2578: Case, et al., "Structure of Management Information Version 2 (SMIv2)," The Internet Society, Apr. 1999, pp. 1-43.
RFC 6022: Scott, et al., "YANG Module for NETCONF Monitoring," IETF Trust, Oct. 2010, pp. 1-28.
RFC 6241: Enns, et al., "Network Configuration Protocol (NETCONF)," IETF Trust, Jun. 2011, pp. 1-113.
RFC 6470: Bierman, A., "Network Configuration Protocol (NETCONF) Base Notifications," IETF Trust, Feb. 2012, pp. 1-15.
RFC 6536: Bierman, et al., "Network Configuration Protocol (NETCONF) Access Control Model," IETF Trust, Mar. 2012, pp. 1-49.
RFC 7317: Bierman, et al., "A YANG Data Model for System Management," IETF Trust, Aug. 2014, pp. 1-35.
RFC 7923: Voit, et al., "Requirements for Subscription to YANG Datastores," IETF Trust, Jun. 2016, pp. 1-18.
RFC 7950: Bjorklund, M., "The YANG 1.1 Data Modeling Language," IETF Trust, Aug. 2016, pp. 1-217.
RFC 8341: Bierman, et al., "Network Configuration Access Control Model," IETF, Mar. 2018, pp. 1-58.
Wallin, et al., "Automating Network and Service Configuration Using NETCONF and YANG," USENIX, Sep. 23, 2011, pp. 1-13.

* cited by examiner

METHOD FOR RESTRICTING ACCESS TO A MANAGEMENT INTERFACE USING STANDARD MANAGEMENT PROTOCOLS AND SOFTWARE

CROSS-REFERENCE TO RELATED APPLICATIONS

This application is a national stage of International Application No. PCT/IB2018/056644, filed Aug. 30, 2018, which is hereby incorporated by reference.

TECHNICAL FIELD

Embodiments relate to the field of network management; and more specifically, to restricting access to a management interface.

BACKGROUND ART

A management system can manage one or more network devices by accessing a management interface. A network device managed by a management system may be referred to as a managed network device. The management interface allows the management system to perform various management operations on a managed network device such as reading configuration data from the network device, writing configuration data to the network device, executing remote procedure calls or other actions/commands on the managed network device, and subscribing to notifications emitted by the managed network device. The management interface may be defined by a data model. The data model defines the data that can be sent over the management interface such as writable data that can be configured to control the behavior of the managed network device and read-only data that represents the current state of the managed network device. The data model may also define the actions/commands that can be executed on the managed network device and the notifications that can emitted by the managed network device. A data model is typically partitioned into smaller components called modules (and submodules). A data model and its modules can be formally defined using a data modeling language such as YANG, Structure of Management Information (SMI), and $3^{rd}$ Generation Partnership Project (3GPP) Managed Objects, to name a few examples.

The management system can access the management interface using a management protocol such as Network Configuration Protocol (NETCONF), Representational State Transfer Configuration Protocol (RESTCONF), Simple Network Management Protocol (SNMP), and Common Object Request Broker Architecture (CORBA), to name a few examples. Some management interfaces are "open" in that they are accessible to any management system. That is, any management system is allowed to retrieve the documentation of the data model and to perform management operations by accessing the management interface. In contrast, some management interfaces are "closed" in that only some management systems are allowed to retrieve the documentation of the data model and to access the management interface to perform management operations.

An equipment provider (e.g., a vendor) may provide a managed network device to an equipment operator (e.g., a customer) for use by the equipment operator. The equipment provider may preinstall the managed network device with a data model that defines the management interface that can be used to manage the managed network device. In some cases, the equipment provider may want to hide the details of the management interface from the equipment operator (e.g., certain parts of the data model and the implementation solutions behind them) while still providing the functionality of the management interface (e.g., this may be the case if the data model has intellectual property or other proprietary information that the equipment provider wants to hide from the equipment operator). This would require restricting access to the on-line documentation of the data model and restricting access to the management interface itself (since access to the management interface could result in reverse engineering the data model or other details of the management interface using repeated configuration and data retrieval requests). Existing access control mechanisms such as the one described in Internet Engineering Task Force (IETF) Request for Comment (RFC) 6536 allow restricting certain users (e.g., certain personnel of the equipment operator) from being able to access a management interface. However, the equipment provider cannot use this to hide the details of the management interface from the equipment operator, as the equipment operator typically has full control over the access control mechanism and the associated access rules. Furthermore, it is not possible with existing access control mechanisms for the equipment provider to restrict management systems not approved by the equipment provider from being able to access the management interface, as there is no way to determine whether a management system accessing the management interface is approved by the equipment provider.

SUMMARY

A method is implemented by a network device to restrict access to a management interface, where the management interface is defined by a data model, and where the network device is provided by an equipment provider to an equipment operator for use by the equipment operator. The method includes receiving a first request from a management system to perform a first management operation that involves accessing a module of the data model, where the first request specifies a security credential as a key for a security wrapper defined by the module, and where the security credential is supplied to the management system by the equipment provider and is inaccessible to the equipment operator, verifying whether the security credential specified by the first request is valid, and performing the first management operation in response to verifying that the security credential specified by the first request is valid.

A network device is configured to restrict access to a management interface, wherein the management interface is defined by a data model, and wherein the network device is to be provided by an equipment provider to an equipment operator for use by the equipment operator. The network device includes a set of one or more processors and a non-transitory machine-readable storage medium having stored therein a management server component. The management server component, when executed by the set of one or more processors, causes the network device to receive a first request from a management system to perform a first management operation that involves accessing a module of the data model, wherein the first request specifies a security credential as a key for a security wrapper defined by the module, and wherein the security credential is supplied to the management system by the equipment provider and is inaccessible to the equipment operator, verify whether the security credential specified by the first request is valid, and perform the first management operation in response to verifying that the security credential specified by the first request is valid.

A non-transitory machine-readable medium has computer code stored therein, which when executed by a set of one or more processors of a network device provided by an equipment provider to an equipment operator for use by the equipment operator, causes the network device to perform operations for restricting access to a management interface, wherein the management interface is defined by a data model. The operations include receiving a first request from a management system to perform a first management operation that involves accessing a module of the data model, where the first request specifies a security credential as a key for a security wrapper defined by the module, and where the security credential is supplied to the management system by the equipment provider and is inaccessible to the equipment operator, verifying whether the security credential specified by the first request is valid, and performing the first management operation in response to verifying that the security credential specified by the first request is valid.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
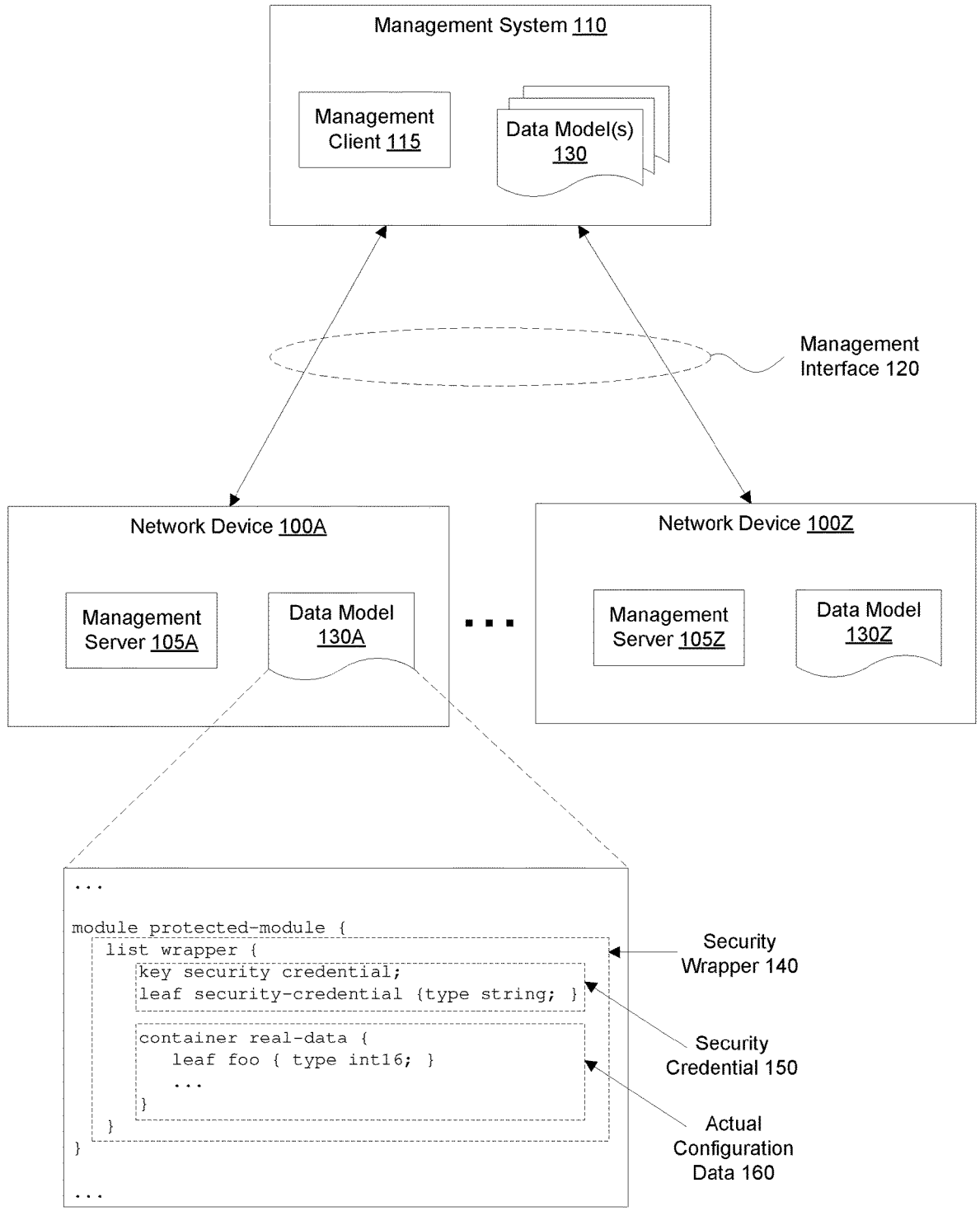
FIG. 1 is a block diagram illustrating a system that restricts access to a management interface, according to some embodiments.

The following description describes methods and apparatus for restricting access to a management interface. As will be further described herein, an equipment provider may use the techniques described herein to hide parts of a data model from an equipment operator, while still providing the functionality of the hidden parts. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, an equipment provider (e.g., a vendor) may want to hide the details of the management interface from an equipment operator (e.g., certain parts of the data model defining the management interface and the implementation solutions behind them) while still providing the functionality of the management interface (e.g., this may be the case if the data model has intellectual property or other proprietary information that the equipment provider wants to hide from the equipment operator). This would require restricting access to the on-line documentation of the data model and restricting access to the management interface itself (since access to the management interface could result in reverse engineering the data model or other details of the management interface using repeated configuration and data retrieval requests). However, existing access control mechanisms cannot be used to achieve this, as the equipment operator typically has full control over the access control mechanism and the associated access rules. Furthermore, it is not possible with existing access control mechanisms for the equipment provider to restrict management systems not approved by the equipment provider from being able to access the management interface, as there is no way to determine whether a management system accessing the management interface is approved by the equipment provider.

Embodiments disclosed herein provide an access control mechanism that only allows a management system to access certain parts of the data model if it supplies a valid security credential. This can be achieved by wrapping these parts of the data model inside a security wrapper, where a valid security credential is needed to access the parts inside the security wrapper. The parts of the data model that are to be protected using the security wrapper may be referred to herein as "protected" parts of the data model. As will be described in further detail below, an equipment provider that provides both the management system and the managed network device to an equipment operator can use the access control mechanism to provide the functionality related to the protected parts, while still hiding the protected parts from others, including the equipment operator. According to various embodiments, the security wrapper is implemented using an existing data construct of the data modeling language (e.g., a YANG list construct), which allows the access control mechanism to be implemented with minimal changes to the underlying instrumentation software, and without the need to implement separate dedicated software and/or a separate protocol for the access control mechanism.

FIG. 1 is a block diagram illustrating a system that restricts access to a management interface, according to some embodiments. The system includes a management system 110 that is communicatively coupled to one or more network devices (e.g., network devices 100A-Z). The management system 110 manages each of the managed network devices 100, and thus these network devices 100 may be referred to herein as "managed" network devices 100. The management system 110 may manage a managed network device by accessing a management interface 120. As shown in the diagram, the management system 110 includes a management client 115 and each managed network device 100 includes a management server 105. The management client 115 invokes management operations on a management server 105, while each management server 105 performs management operations invoked by the management client 115. Various embodiments will be described herein in a context where the management system 110 implements the functionality of a management client 115 and each managed network device 100 implements the functionality of a management server 105. Thus, management functionality performed by the management system 110 should generally be understood as being management client functionalities, while management functionality performed by the managed network devices 100 should generally be understood as being management server functionalities.

The management interface 120 between the management system 110 and a managed network device 100 is defined by a data model 130. As shown in the diagram the management system includes a plurality of data models 130. Each of the data models 130 may correspond to a data model 130 included in one of the managed network devices 100, and defines the management interface between the management system 110 and that managed network device 100. For example, the management interface 120 between management system 110 and managed network device 100A may be defined by data model 130A, while the management interface 120 between management system 110 and managed network device 100Z may be defined by data model 130Z. While the diagram shows each managed network device 100 as having a different data model 130, it should be understood that multiple managed network devices 100 can use the same data model 130.

The data model 130 may describe the data that can be sent over the management interface 120. This data may include, for example, writable data that can be configured to control the behavior of the managed network device 100 and read-only data that represents the current state of the managed network device 100. The data model 130 may also describe the actions/commands that can be executed on the managed network device 100 and the notifications that the managed network device 100 emits. A data model 130 is typically partitioned into smaller components called modules. The data model 130 and its modules can be formally defined using a data modeling language such as YANG, Structure of Management Information (SMI), and $3^{rd}$ Generation Partnership Project (3GPP) managed objects, to name a few examples.

As mentioned above, the management system 110 can manage a managed network device 100 by accessing a management interface 120 defined by a data model 130. The management system 110 can access the management interface 120 using a management protocol such as Network Configuration Protocol (NETCONF), Representational State Transfer Configuration Protocol (RESTCONF), Simple Network Management Protocol (SNMP), and Common Object Request Broker Architecture (CORBA), to name a few examples. In one embodiment, communications between the management system 110 and a managed network device 100 is protected using a security protocol (e.g., the security protocol used by the underlying management protocol (e.g., NETCONF uses Secure Shell (SSH) or Transport Layer Security (TLS))). For purposes of illustration only, various embodiments will primarily be described herein in a context where the management system 110 manages the managed network devices 100 using NETCONF as the management protocol and using YANG as the data modeling language. It should be understood, however, that the techniques described herein can be implemented using other management protocols and other data modeling languages (e.g., the techniques described herein can be implemented using RESTCONF and/or a model-driven command line interface (CLI)).

As mentioned above and shown in the diagram, managed network device 100A includes data model 130A. This data model 130A may define one or more modules. As shown in the diagram, data model 130A defines, among other modules, a module called "protected-module." This module defines a security wrapper 140, which in this example is defined as a list called "wrapper." The security wrapper 140 defines a security credential 150 and actual configuration data 160. In this example, the security credential 150 is defined as a leaf called "security-credential" and the actual configuration data 160 is defined as a container called "real-data." Thus, the "wrapper" list is defined to be a list where each list entry includes a "security-credential" leaf and a "real-data" container. The "security-credential" leaf is defined as a string (as indicated by the statement "type string;") and is to carry a security credential. The "real-data" container defines the parts of the module that are to be protected. In this example, the "real-data" container is defined to include, among other things, a leaf called "foo," which is defined to be a 16-bit signed integer (as indicated by the "type int16" statement). The security credential 150 is designated as the key (or index) for the security wrapper 140. In this example, this is achieved by designating the "security-credential" leaf as the key for the "wrapper" list (using the "key security credential;" statement). In YANG, the key for a list uniquely identifies a list entry and must be provided to access a particular list entry. By designating the security credential 150 as the key for the security wrapper 140, any accesses to specific parts defined inside the security wrapper 140 will require the security credential 150.

For example, if the management system 110 wants to read the "foo" leaf defined inside the "wrapper" list, then it has to send a read request to the managed network device 100A that specifies a security credential as the key for the security wrapper. When the managed network device 100A receives this request, it can verify whether the security credential specified by the request is valid. If the security credential is valid, then the managed network device 100A may send a response to the management system indicating the value of the "foo" leaf. If the security credential is invalid, then the managed network device 100 may ignore the request or otherwise refrain from performing the requested operation. In one embodiment, if the security credential is invalid, then the managed network device 100 sends an error message to the management system 110 indicating that the request could not be fulfilled. The specific error message to be sent can be defined by the management protocol and/or the data modeling language. In one embodiment, the error message specifically indicates that the request could not be fulfilled because the security credential specified by the request is invalid. In general, management operations (e.g., read, write, execute a remote procedure call (RPC), subscriptions, etc.) are only allowed if the management system provides a valid security credential. The security credential can take the form of a certificate, a license, shared secrets, a cryptographic key, a password, or a security token. A module that defines a security wrapper 140 may be referred to as a "protected" module. While the details of a single module defined by the data model 130A (the "protected-module" module) is shown in the diagram, it should be understood that the data model 130A can define additional modules, some of which are protected modules, and some of which are unprotected modules. Thus, it is possible to protect some of the modules of a data model 130, while not protecting other modules of the data model 130.

In one embodiment, several aspects of the management interface 120 can be restricted to hide the protected parts (e.g., protected modules) of a data model. This includes: (1) restricting access to on-line documentation of the data model; (2) restricting write operations; (3) restricting read operations; (4) restricting actions and RPCs; and (5) restricting notifications. Each of these aspects will be further described herein below.

(1) Restricting Access to On-Line Documentation of the Data Model

A management interface 120 may provide the ability for a management system 110 to retrieve documentation of the data model 130 directly from a managed network device 100 (such documentation is referred to herein as "on-line" documentation—as opposed to "off-line" documentation that can be found, for example, in the form of printed materials or Portable Document Format (PDF) files, which causes the protected parts of the data model 130 (e.g., a protected module) to be exposed. To prevent this, in one embodiment, a managed network device 100 maintains two versions of the documentation of a protected module—(1) a full version and (2) a stubbed version. The full version of the documentation of the protected module includes the full documentation of the protected parts wrapped inside the security wrapper and is used to drive the instrumentation software implementing the protected module. In contrast, the stubbed version of the documentation of the module does not include documentation of the protected parts but replaces the protected parts with a stub. In one embodiment, if the managed network device 100 receives a request from a management system 110 for documentation of a protected module, the managed network device 100 responds by providing the stubbed version of the documentation of the module to the management system 110 (instead of the full version). This way, the protected parts inside the security wrapper do not get exposed. An example of the full version of the documentation for the "protected-module" module and the stubbed version of the documentation of the module is provided below. As shown below, in the stubbed version, the protected parts (the parts inside the "wrapper" list) are replaced with a stub (a YANG "anydata" construct called "real-data").

Full version:
  module protected-module {
    //full version
    list wrapper {
    key security credential;
    leaf security-credential {type string;}
    container real-data {
      leaf foo {type int16;}
      . . . .
    }
  }
}
Stubbed version:
  module protected-module {
    //stubbed version
    list wrapper {
    key security credential;
    leaf security-credential {type string;}
    anydata real-data;
  }
}

(2) Restricting Write Operations

A management interface 120 may provide the ability for a management system 110 to write data to a managed network device 100 (e.g., edit-config and edit-data operations in NETCONF/YANG). In one embodiment, any requests by the management system 110 to write data defined by a protected module must specify a security credential due to the presence of the security wrapper (since the security credential is designated as a key (index) for the security wrapper). In one embodiment, if the managed network device 100 receives a request from the management system 110 to write data defined by a protected module, it determines whether the security credential specified by the request is valid, and only performs the requested write operation if the security credential is valid. If the security credential is invalid, then the managed network device 100 may ignore the request or otherwise treat the request as if no data exists (e.g., treat as a request to write to a non-existent list entry) (and may also send an error message to the management system 110 indicating that the request could not be fulfilled).

(3) Restricting Read Operations

A management interface 120 may provide the ability for a management system 110 to read data from a managed network device 100 (e.g., get-config and get-data operations in NETCONF/YANG). A request by a management system 110 to read data can either ask for all data in a datastore or for filtered data. In the case of a request to read filtered data, the request will include a filter that specifies the portions of the datastore to read. In one embodiment, if the managed network device 100 receives a request from a management system 110 to read all data in a datastore, it provides a response as if no data exists inside the security wrapper for the protected modules (since the request does not specify a security credential). In one embodiment, such an "all data" request can be detected based on the absence of a filter, which can be detected, for example, based on an explicit indication made available by the management interface 120 or by detecting an attempt to list all of the data inside a security wrapper (e.g., attempt to list all list entries of "wrapper" list). In one embodiment, any requests by the management system 110 to read filtered data defined by a protected module must specify a security credential due to the presence of the security wrapper. In one embodiment, if the managed network device 100 receives a request from the management system 110 to read filtered data defined by a protected module, it determines whether the security credential specified by the request is valid, and only performs the requested read operation if the security credential is valid. If the security credential is invalid, then the managed network device 100 may ignore the request or otherwise treat the request as if no data exists (e.g., treat as a request to read a non-existent list entry) (and may also send an error message to the management system 110 indicating that the request could not be fulfilled).

In one embodiment, if the managed network device 100 receives a request from a management system 110 to copy the entire datastore externally (e.g., copy-config operation in NETCONF/YANG), it treats the request similar to a request to read all data in the datastore. That is, since this is considered an "all data" request that does not specify a security credential, the request is handled as if no data exists inside the security wrapper for the protected modules. However, if the managed network device 100 receives a request from a management system 110 to copy the entire datastore internally (e.g., copy-config to another datastore or discard-edits operations), it may perform the request even if the request does not specify the security credential, as this does not expose information outside of the managed network device 100.

(4) Restricting Actions and RPCs

A management interface 120 may provide the ability for a management system 110 to execute an action or RPC on a managed network device 100. Any requests by the management system 110 to execute an action defined by a protected module must specify a security credential due to the presence of the security wrapper. In one embodiment, if the managed network device 100 receives a request from the management system 110 to execute an action defined by a protected module, it determines whether the security credential specified by the request is valid, and only executes the requested action if the security credential is valid. If the security credential is invalid, then the managed network device 100 may ignore the request or otherwise refrain from executing the action (and may also send an error message to the management system 110 indicating that the request could not be fulfilled). In one embodiment, any actions and/or RPCs defined inside a protected module are configured to require a security credential as an input parameter, which can be checked by the managed network device 100.

In one embodiment, any actions and/or RPCs defined outside of a protected module are not allowed to read or write data defined by the protected module. It is desirable that any action and/or RPC definitions respect the boundaries between the protected parts (e.g., protected modules) and the non-protected parts (e.g., non-protected modules) of a data model 130. The instrumentation software that implements a protected module typically handles any read/write requests for the protected module even for actions and/or RPCs defined outside of the protected module. Thus, in one embodiment, the instrumentation software can reject any attempts by actions and/or RPCs defined outside of the protected module to read/write data defined by the protected module.

(5) Restricting Notifications

A management interface 120 may provide the ability for a management system 110 to subscribe to receive notifications from a managed network device 100. A notification is a message generated by a managed network device 100 to indicate that a certain event has been recognized. Notifications may be specific to a module or generic to an entire data model 130. In one embodiment, notifications that are specific to a protected module are defined inside that protected module. In one embodiment, any notifications that are specific to a protected module are not included in standard notification streams (e.g., the notification messages sent from a NETCONF server to a client, as described in Internet Engineering Taskforce (IETF) Request for Comments (RFCs)). Rather, dedicated notification streams are used, where subscribing to these dedicated notification streams is only allowed if a filter is applied. In one embodiment, the filter must include a valid security credential for the protected module, otherwise the standard filtering procedures prevent any data defined by the protected module from being sent in a notification.

Generic notifications are notifications that provide some general handling related to all parts of the data model 130. An example of a generic notification is a data change notification about the datastore (e.g., as described in IETF Request for RFC 6470 or draft-ietf-netconf-yang-push). In one embodiment, these notifications are generally needed for the management of non-protected modules that any management system 110 expects to be able to access, and thus are not blocked. In one embodiment, a management system 110 is allowed to subscribe to receive generic notifications from a managed network device 100, but the managed network device 100 blocks individual notifications if they include data defined by a protected module. This allows the management system 110 to receive notifications without having to change its subscriptions. In another embodiment, the managed network device 100 may deny any request by a management system 110 to subscribe to receive notifications if it would result in exposing data defined by a protected module. This may require the management system 110 to selectively subscribe to receive notifications in a manner that excludes any subscriptions that would result in exposing data defined by protected modules.

Session-Based Restrictions

Some management protocols allow the management system 110 and a managed network device 100 to communicate using a management session. A management session provides a logical connection between the management system 110 and the managed network device 100 to carry out management functions. In one embodiment, the management session itself can be authorized to access protected parts (e.g., a protected module) of a data model. For this purpose, a protected module may define a special action/RPC/operation that authorizes the current management session to access a protected module. The authorization can be based on a security credential that is used as the key (an index) for the security wrapper defined by the protected module. If the management session is authorized, then the authorization can be registered in the management session information. The managed network device 100 (and more specifically, the instrumentation software implementing the protected module) may decide whether to perform a read/write/action/RPC request from a management system 110 and/or whether to emit a notification to the management system 110 based on whether the management session is authorized.

An equipment provider (e.g., a vendor) may implement the access control mechanisms described herein to hide parts of a data model from an equipment operator (e.g., a customer of the vendor) while still providing the functionality of the hidden parts. For example, an equipment provider may provide a management system 110 and a managed network device 100 to an equipment operator, where the management system is preinstalled with a security credential that is inaccessible to the equipment operator (e.g., the security credential is internal to an application installed on the management system 110 and is not made available over any interface that the application supports). This provides the functionality of the hidden parts of the data model (e.g., protected modules), while hiding the details of these parts from the equipment operator. Also, the access control mechanism described herein can be implemented with only slight modifications to existing data models and underlying instrumentation software, as the security wrapper can be implemented using an existing data construct of the data modeling language (e.g., a list construct of YANG). Thus, there is no need to implement separate dedicated software and/or a separate protocol to implement the access control mechanism.

Figure 2:
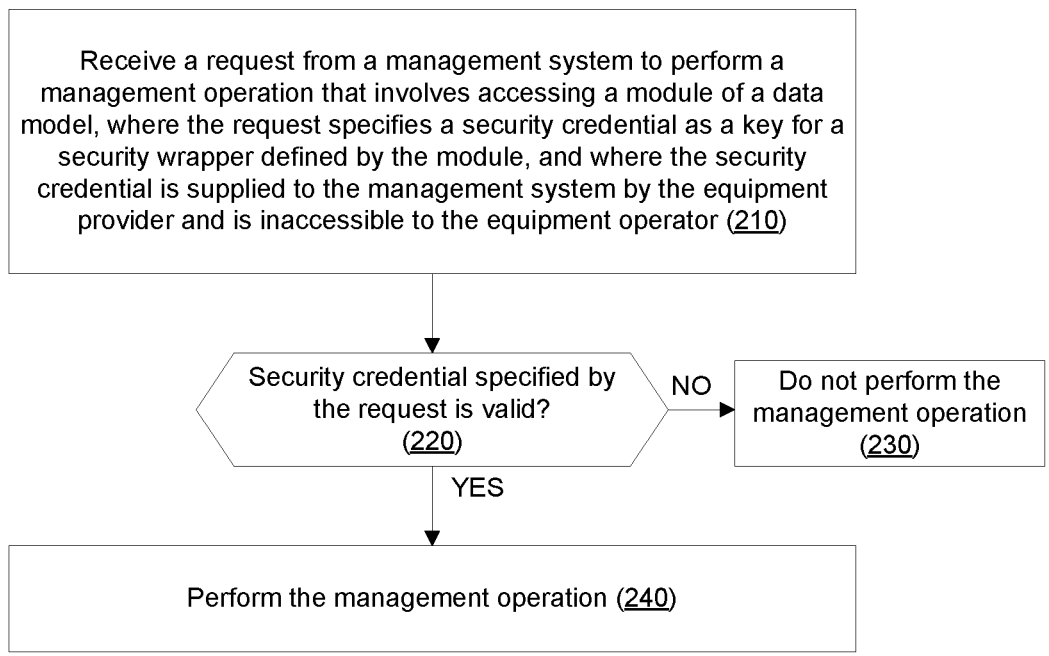
FIG. 2 is a flow diagram of a process for restricting access to a management interface, according to some embodiments.

FIG. 2 is a flow diagram of a process for restricting access to a management interface, according to some embodiments. In one embodiment, the process is implemented by a network device 100 that is managed by a management system 110. In one embodiment, the network device 100 is provided by an equipment provider (e.g., a vendor) to an equipment operator (e.g., a customer of the vendor) for use by the equipment operator. The operations in the flow diagrams will be described with reference to the exemplary embodiments of the other figures. However, it should be understood that the operations of the flow diagrams can be performed by embodiments of the other than those discussed with reference to the other figures, and embodiments discussed with reference to these other figures can perform operations different than those discussed with reference to the flow diagrams.

At block 210, the network device 100 receives a request from a management system 110 to perform a management operation that involves accessing a module of a data model 130, where the request specifies a security credential as a key for a security wrapper defined by the module, and where the security credential is supplied to the management system 110 by the equipment provider and is inaccessible to the equipment operator. In one embodiment, the security wrapper is defined by the module as a list and the security credential is the key for the list. In an embodiment where the security wrapper is defined as a list, the network device 100 may deny a request from the management system 110 to read all list entries of the list (assuming the management system 110 has not provided a valid security credential). In one embodiment, the security credential is any one of a license, a shared secret, a cryptographic key, and a security token. In one embodiment, the request is any one of a request to write or read data defined by the module or a request to subscribe to receive notifications defined by the module. In one embodiment, the data model 130 is a YANG data model and the network device 100 communicates with the management system 110 using NETCONF. In one embodiment, communications between the management system 110 and the network device 100 are secured using a security protocol (e.g., SSH or TLS).

At decision block 220, the network device 100 determines whether the security credential specified by the request is valid. If the security credential is invalid, then at block 230, the network device 100 does not perform the requested management operation. However, if the security credential is valid, then at block 240, the network device 100 performs the requested management operation.

In one embodiment, the network device 100 receives a second request from the management system 110 to execute an RPC (or an action) defined by the module, where the second request specifies the security credential as a parameter of the RPC. The network device 100 may then verify whether the security credential specified by the second request (as a parameter of the RPC (or action)) is valid and execute the RPC (or action) in response to verifying that the security credential specified by the second request is valid. Otherwise, if the security credential specified by the second request is invalid, then the network device 100 may not execute the RPC (or action).

The process thus restricts access to the management interface 120 based on whether the management system 110 provides a valid security credential. The equipment operator can use the process to control which management systems 110 can access the management interface 120. Only the management systems 110 that have the security credential installed can access the management interface 120.

Figure 3:
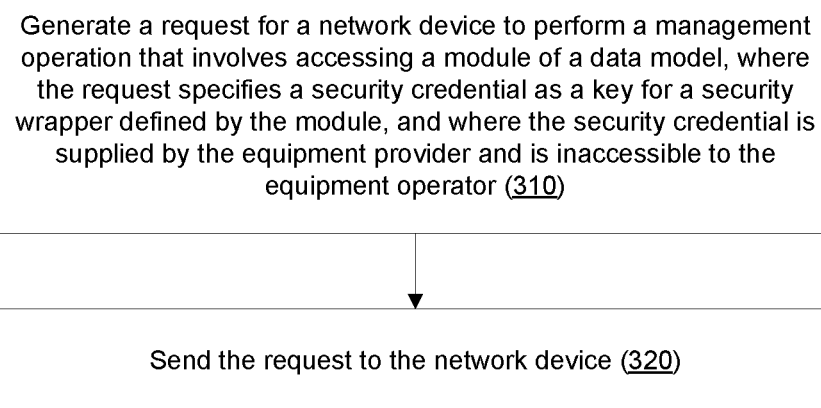
FIG. 3 is a flow diagram of a process for accessing a management interface, according to some embodiments.

FIG. 3 is a flow diagram of a process for accessing a management interface, according to some embodiments. In one embodiment, the process is implemented by a management system 110 that manages a network device 100. In one embodiment, the network device 100 is provided by an equipment provider to an equipment operator for use by the equipment operator.

At block 310, the management system generates a request for a network device to perform a management operation that involves accessing a module of a data model, where the request specifies a security credential as a key for a security wrapper defined by the module, and where the security credential is supplied by the equipment provider and is inaccessible to the equipment operator. At block 320, the management system sends the request to the network device.

Figure 4:
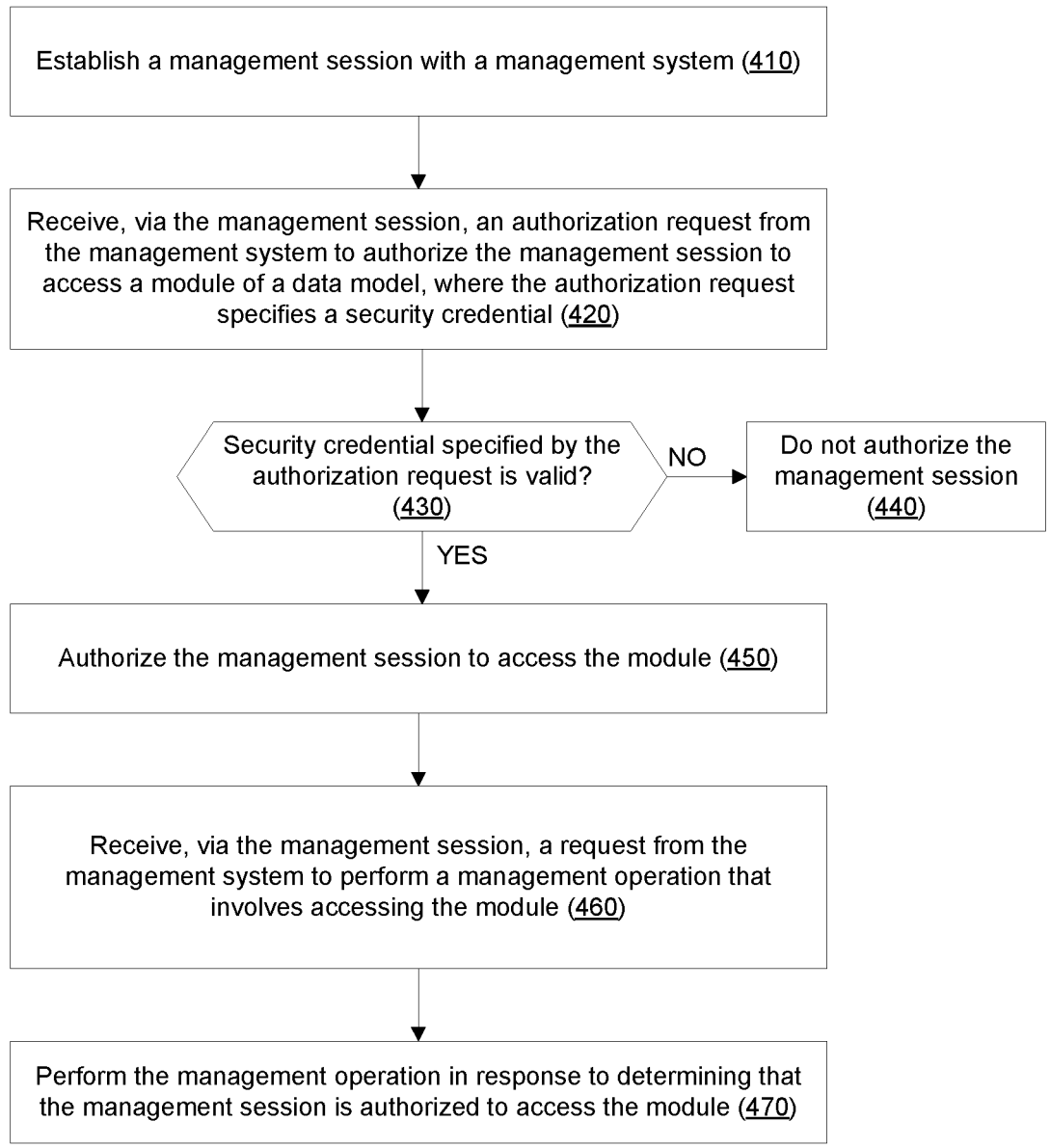
FIG. 4 is a flow diagram of a process for restricting access to a management interface using a management session, according to some embodiments.

FIG. 4 is a flow diagram of a process for restricting access to a management interface using a management session, according to some embodiments. In one embodiment, the process is implemented by a network device 100 that is managed by a management system 110.

At block 410, the network device 100 establishes a management session with a management system 110. At block 420, the network device 100 receives, via the management session, an authorization request from the management system 110 to authorize the management session to access a module of a data model 130, where the authorization request specifies a security credential. At decision block 430, the network device 100 determines whether the security credential specified by the authorization request is valid. If the security credential is invalid, then at block 440, the network device 100 does not authorize the management session. However, if the security credential is valid, then at block 450, the network device 100 authorizes the management session to access the module.

Subsequently, at block 460, the network device 100 receives, via the management session, a request from the management system 110 to perform a management operation that involves accessing the module. In one embodiment, the request is a request that does not specify the security credential (e.g., an "all data" request). At block 470, the network device 100 performs the management operation in response to determining that the management session is authorized to access the module.

Figure 5:
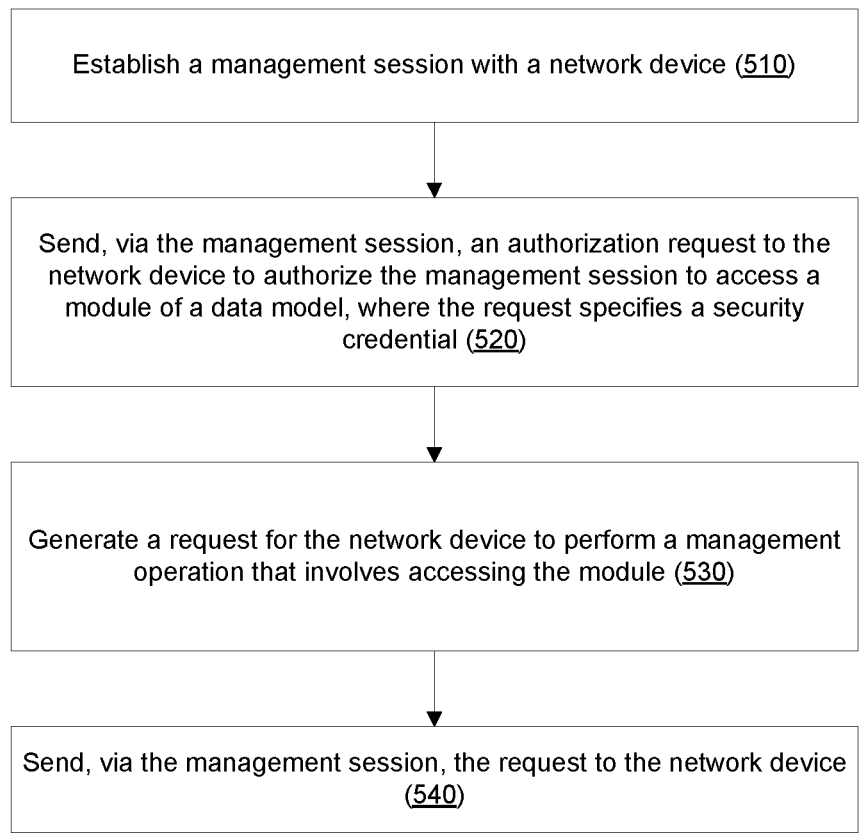
FIG. 5 is a flow diagram of a process for accessing a management interface using a management session, according to some embodiments.

FIG. 5 is a flow diagram of a process for accessing a management interface using a management session, according to some embodiments. In one embodiment, the process is implemented by a management system 110 that manages a network device 100.

At block 510, the management system 110 establishes a management session with a network device 100. At block 520, the management system 110 sends, via the management session, an authorization request to the network device 100 to authorize the management session to access a module of a data model, where the request specifies a security credential.

After the management session has been successfully authorized to access the module, at block 530, the management system 110 generates a request for the network device 100 to perform a management operation that involves accessing the module and at block 540, sends, via the management session, the request to the network device 100.

Figure 6:
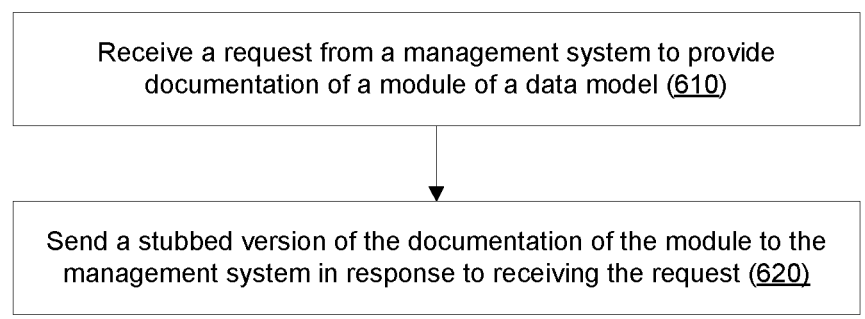
FIG. 6 is a flow diagram of a process for restricting access to on-line documentation of a data model, according to some embodiments.

FIG. 6 is a flow diagram of a process for restricting access to on-line documentation of a data model, according to some embodiments. In one embodiment, the process is implemented by a network device 100 that is managed by a management system 110.

At block 610, the network device 100 receives a request from a management system 110 for documentation of a module of a data model. At block 620, the network device 100 sends a stubbed version of the documentation of the module (as opposed to the full version of the documentation) to the management system 110 in response to receiving the request, thereby hiding the details of the (protected) module from the management system.

Figures 7A, 7B:
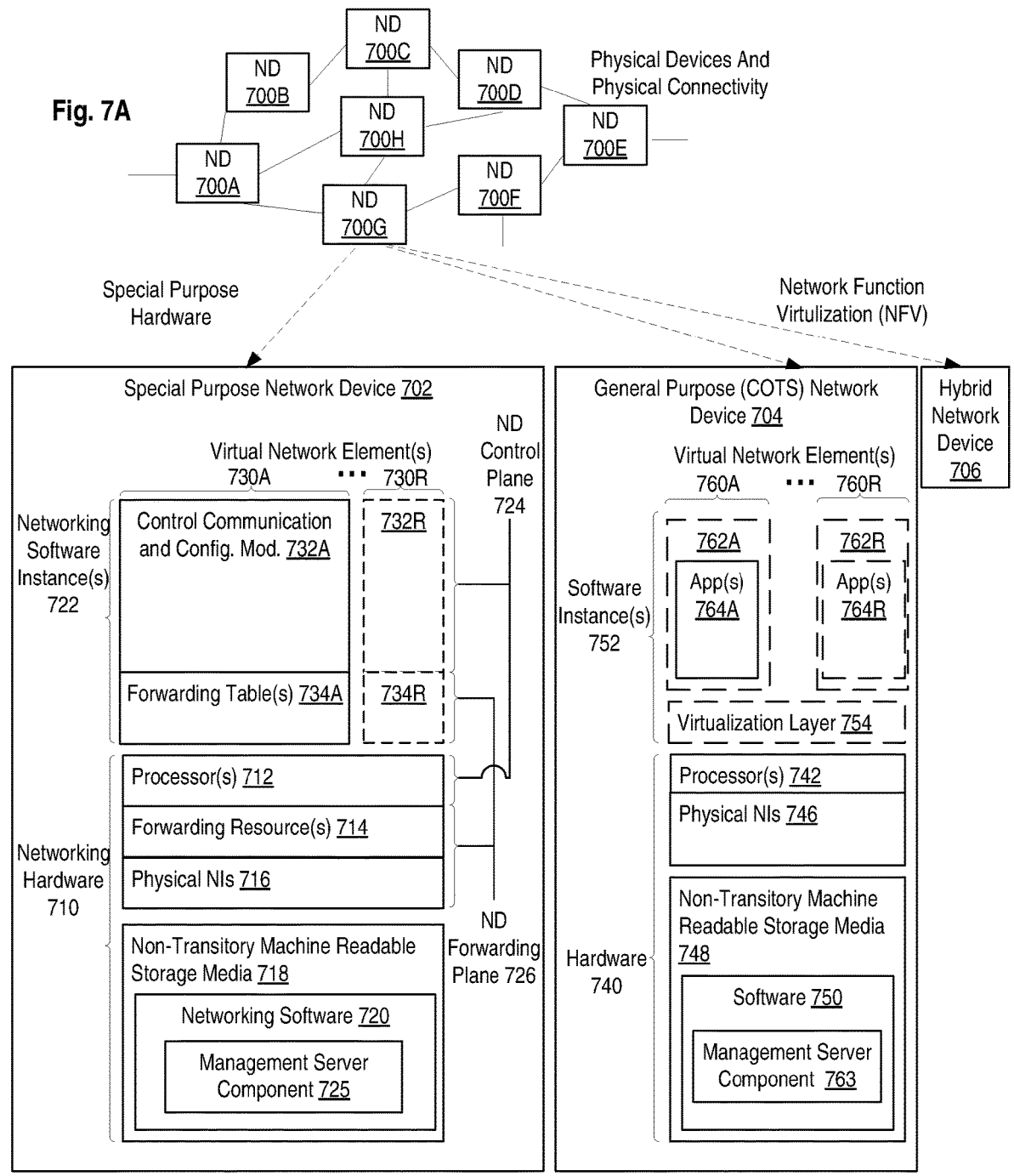
FIG. 7A illustrates connectivity between network devices (NDs) within an exemplary network, as well as three exemplary implementations of the NDs, according to some embodiments.
FIG. 7B illustrates an exemplary way to implement a special-purpose network device according to some embodiments.

FIG. 7A illustrates connectivity between network devices (NDs) within an exemplary network, as well as three exemplary implementations of the NDs, according to some embodiments. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code such as management server component 725, which when executed by networking hardware 710, causes the special-purpose network device 702 to perform operations of one or more embodiments described herein above as part networking software instances 722 (e.g., to provide functionality of a management server, including the access control mechanisms described herein).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications finning in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-

R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

Software 750 can include code such as management server component 763, which when executed by processor(s) 742, cause the general purpose network device 704 to perform operations of one or more embodiments described herein above as part software instances 762A-R (e.g., to provide functionality of a management server, including the access control mechanisms described herein).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
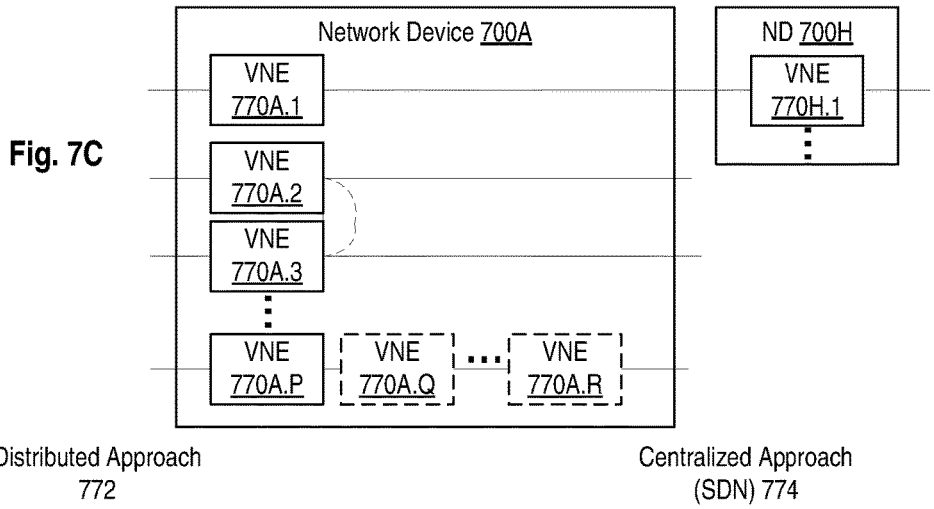
FIG. 7C illustrates various exemplary ways in which virtual network elements (VNEs) may be coupled according to some.

FIG. 7C illustrates various exemplary ways in which VNEs may be coupled according to some embodiments. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
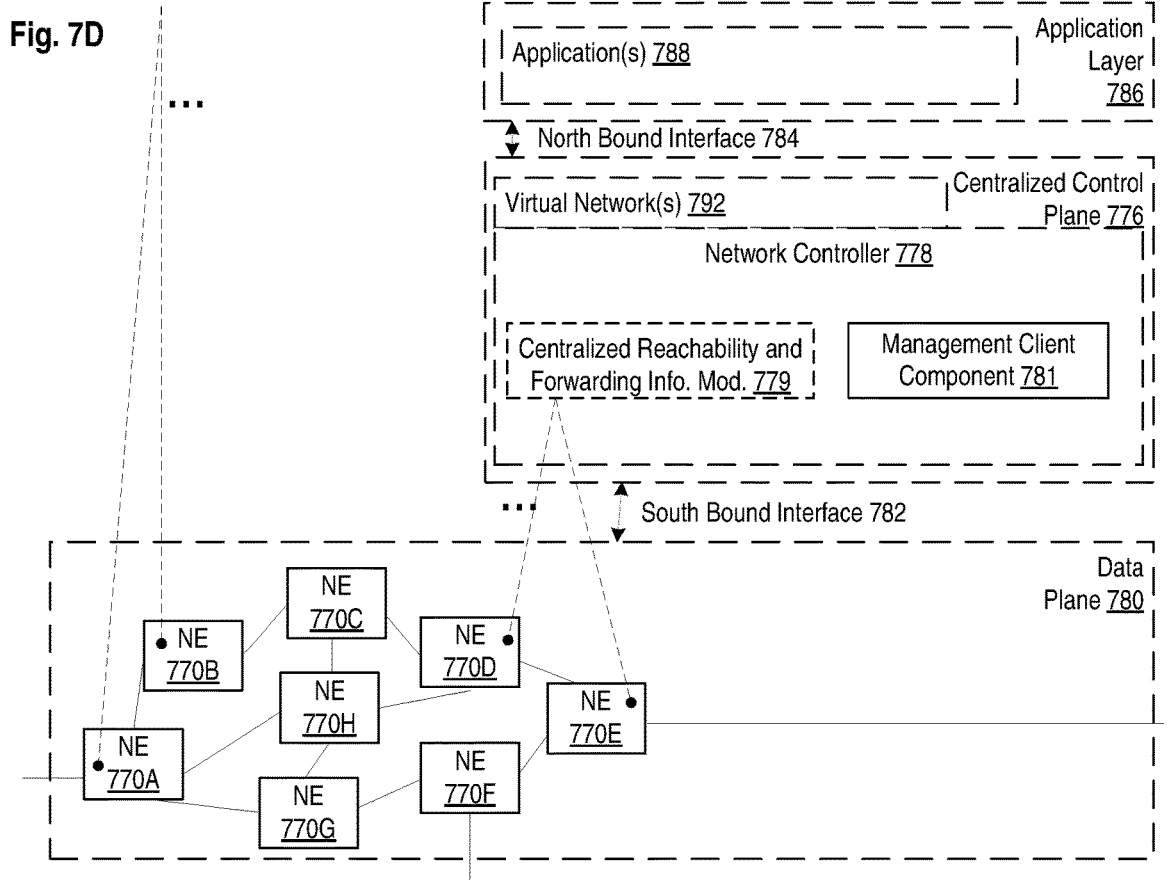
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

In one embodiment, the network controller 778 may include a management client component 781 that when executed by the network controller 778, causes the network controller 778 to perform operations of one or more embodiments described herein above (e.g., to provide functionality of a management client).

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
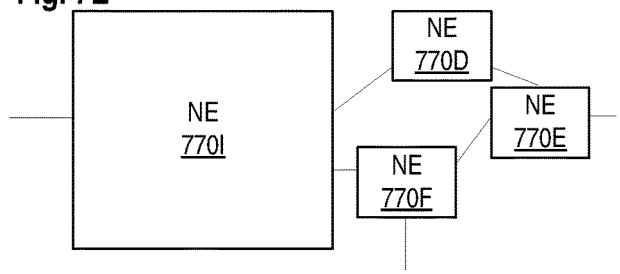
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
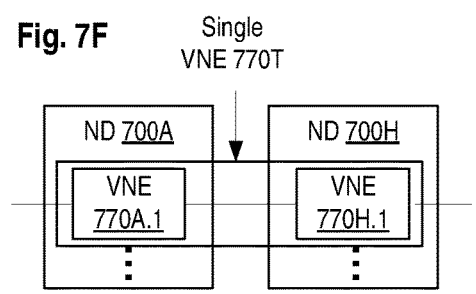
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments. Thus, the abstraction of a NE or VNE can span multiple NDs.

While some embodiments implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
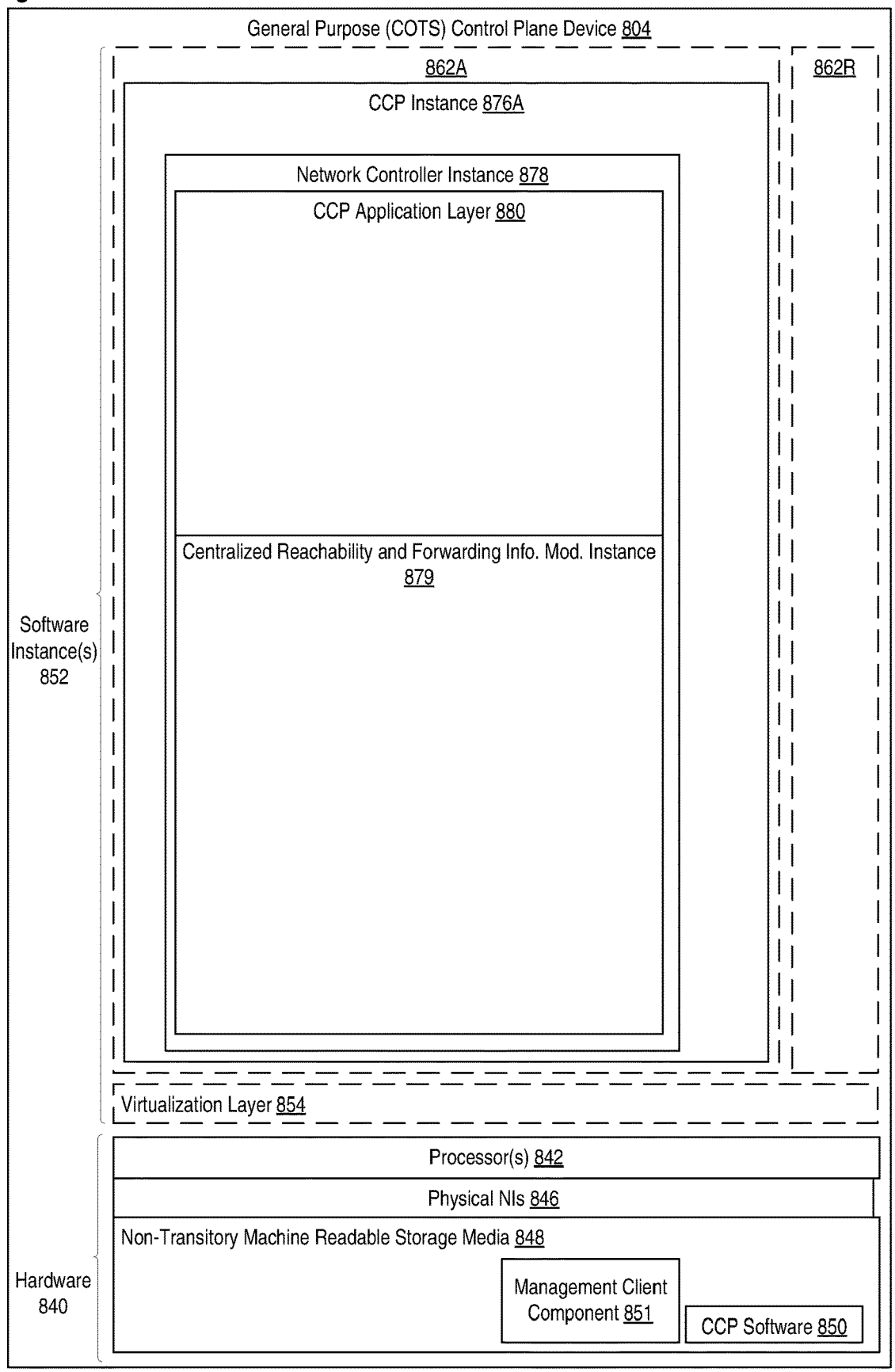
FIG. 8 illustrates a general purpose control plane device with centralized control plane (CCP) software 850), according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850 and a management client component 851.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The management client component 851 can be executed by hardware 840 to perform operations of one or more embodiments described herein above as part of software instances 852 (e.g., to provide functionality of a management client).

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/1Pv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments have been presented through flow diagrams. It will be appreciated that the order of transactions and transactions described in these flow diagrams are only intended for illustrative purposes and not intended as being limiting.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by a network device to restrict access to a management interface, the management interface being defined by a data model, and the network device being provided by an equipment provider to an equipment operator for use by the equipment operator, the method comprising:
   receiving a first request from a management system to perform a first management operation that involves accessing a module of the data model, the first request specifying a security credential as a key for a security wrapper defined by the module as a list, the security credential being the key for the list, and the security credential being supplied to the management system by the equipment provider and being inaccessible to the equipment operator;
   verifying whether the security credential specified by the first request is valid; and
   performing the first management operation in response to verifying that the security credential specified by the first request is valid.

2. The method of claim 1, further comprising:
   denying a request from the management system to read all list entries of the list.

3. The method of claim 1, wherein the security credential is any one of: a certificate, a license, a shared secret, a password, a cryptographic key, and a security token.

4. The method of claim 1, wherein the first request is a request to write or read data defined by the module.

5. The method of claim 1, wherein the first request is a request to subscribe to receive notifications defined by the module.

6. The method of claim 1, further comprising:
   receiving a second request from the management system to execute a remote procedure call or action defined by the module, wherein the second request specifies the security credential as a parameter of the remote procedure call or the action;

verifying whether the security credential specified by the second request is valid; and executing the remote procedure call or the action in response to verifying that the security credential specified by the second request is valid.

7. The method of claim 1, further comprising:

receiving a second request from the management system to provide documentation of the module; and sending a stubbed version of the documentation of the module to the management system in response to receiving the second request.

8. The method of claim 1, further comprising:

establishing a management session with the management system;

receiving, via the management session, an authorization request from the management system to authorize the management session to access the module, wherein the authorization request specifies the security credential;

verifying whether the security credential specified by the authorization request is valid;

authorizing the management session to access the module in response to verifying that the security credential specified by the authorization request is valid;

receiving, via the management session, a second request from the management system to perform a second management operation that involves accessing the module; determining whether the management session is authorized to access the module; and performing the second management operation in response to determining that the management session is authorized to access the module.

9. The method of claim 8, wherein the second request is a request that does not specify the security credential.

10. The method of claim 1, wherein the data model is a YANG data model, and wherein the network device communicates with the management system using Network Configuration Protocol (NETCONF).

11. The method of claim 1, wherein communications between the management system and the network device are secured using a security protocol.

12. A network device configured to restrict access to a management interface, the management interface being defined by a data model, and the network device being to be provided by an equipment provider to an equipment operator for use by the equipment operator, the network device comprising:

a set of one or more processors; and a non-transitory machine-readable storage medium having stored therein a management server component, which when executed by the set of one or more processors, causes the network device to:

receive a first request from a management system to perform a first management operation that involves accessing a module of the data model, the first request specifying a security credential as a key for a security wrapper defined by the module as a list, the security credential being the key for the list, and the security credential being supplied to the management system by the equipment provider and being inaccessible to the equipment operator;

verify whether the security credential specified by the first request is valid; and perform the first management operation in response to verifying that the security credential specified by the first request is valid.

13. The network device of claim 12, wherein the management server component, when executed by the set of one or more processors, further causes the network device to deny a request from the management system to read all list entries of the list.

14. The network device of claim 12, wherein the security credential is any one of:

a certificate, a license, a shared secret, a password, a cryptographic key, and a security token.

15. A non-transitory machine-readable medium having computer code stored therein, which when executed by a set of one or more processors of a network device provided by an equipment provider to an equipment operator for use by the equipment operator, causes the network device to perform operations for restricting access to a management interface, the management interface being defined by a data model, the operations comprising:

receiving a first request from a management system to perform a first management operation that involves accessing a module of the data model, the first request specifying a security credential as a key for a security wrapper defined by the module as a list, the security credential being the key for the list, and the security credential being supplied to the management system by the equipment provider and being inaccessible to the equipment operator;

verifying whether the security credential specified by the first request is valid; and performing the first management operation in response to verifying that the security credential specified by the first request is valid.

16. The non-transitory machine-readable medium of claim 15, wherein the first request is a request to write or read data defined by the module.

17. The non-transitory machine-readable medium of claim 15, wherein the computer code, when executed by the set of one or more processors of the network device, causes the network device to perform further operations comprising:

receiving a second request from the management system to provide documentation of the module; and sending a stubbed version of the documentation of the module to the management system in response to receiving the second request.

\* \* \* \* \*